(12) United States Patent
Park et al.

(10) Patent No.: US 8,099,558 B2
(45) Date of Patent: Jan. 17, 2012

(54) FAIRNESS MECHANISM FOR STARVATION PREVENTION IN DIRECTORY-BASED CACHE COHERENCE PROTOCOLS

(76) Inventors: SeungJoon Park, Los Altos, CA (US); Ching-Tsun Chou, Palo Alto, CA (US); Akhilesh Kumar, Sunnyvale, CA (US)

( * ) Notice: Subject to any disclaimer, the term of this patent is extended or adjusted under 35 U.S.C. 154(b) by 478 days.

(21) Appl. No.: 12/415,929

(22) Filed: Mar. 31, 2009

(65) Prior Publication Data
US 2010/0250861 A1  Sep. 30, 2010

(51) Int. Cl.
*G06F 12/08* (2006.01)

(52) U.S. Cl. .................... 711/141; 711/E12.026

(58) Field of Classification Search .............. None
See application file for complete search history.

(56) References Cited

U.S. PATENT DOCUMENTS

| | | | |
|---|---|---|---|
| 6,009,488 A | 12/1999 | Kaviprapu | |
| 6,487,643 B1 | 11/2002 | Khare et al. | |
| 6,633,960 B1 * | 10/2003 | Kessler et al. | 711/144 |
| 6,826,619 B1 | 11/2004 | Khare et al. | |
| 6,839,325 B2 * | 1/2005 | Schmidl et al. | 370/242 |
| 6,918,015 B2 * | 7/2005 | Kessler et al. | 711/148 |
| 7,050,402 B2 * | 5/2006 | Schmidl et al. | 370/252 |
| 2002/0003792 A1 * | 1/2002 | Schmidl et al. | 370/343 |
| 2002/0012337 A1 * | 1/2002 | Schmidl et al. | 370/349 |
| 2003/0196047 A1 * | 10/2003 | Kessler et al. | 711/147 |
| 2003/0206561 A1 * | 11/2003 | Schmidl et al. | 370/522 |
| 2004/0167992 A1 * | 8/2004 | Carnevale et al. | 709/250 |
| 2004/0198223 A1 * | 10/2004 | Loh et al. | 455/41.1 |
| 2005/0094569 A1 * | 5/2005 | Schmidl et al. | 370/242 |

OTHER PUBLICATIONS

Kumar et al., U.S. Appl. No. 11/699,274, filed Jan. 26, 2007, 42 pages.

* cited by examiner

*Primary Examiner* — Kevin Verbrugge
(74) *Attorney, Agent, or Firm* — Caven & Aghevli LLC

(57) ABSTRACT

Methods and apparatus relating to a fairness mechanism for starvation prevention in directory-based cache coherence protocols are described. In one embodiment, negatively-acknowledged (nack'ed) requests from a home agent may be tracked (e.g., using distributed linked-lists). In turn, the tracked requests may be served in a fair order. Other embodiments are also disclosed.

30 Claims, 7 Drawing Sheets

FAIRNESS MECHANISM FOR STARVATION PREVENTION IN DIRECTORY-BASED CACHE COHERENCE PROTOCOLS

FIELD

The present disclosure generally relates to the field of electronics. More particularly, an embodiment of the invention relates to a fairness mechanism for starvation prevention in directory-based cache coherence protocols.

BACKGROUND

When an electronic system includes multiple local memories, such as local cache memories, servicing of access requests to the multiple local memories needs to be maintained. This servicing of access requests typically includes sending a message indicating that a request to access a particular location in a memory device cannot be serviced and should be retried at a future time. As the number of local memory devices and/or processors increases, the problem of these "retried" access requests also increases.

The cache memory in multiprocessor systems may be kept coherent using a snoopy bus or a directory based protocol. In either case, a memory address is associated with a particular location in the system. This location is known as the "home node" of the memory address. In a directory based protocol, multiple processing/caching agents may concurrently make requests to the home node for access to the same memory address with which the home agent is associated. "Target node" refers to a node which is the target of a request to access a location in memory associated with the node. A node sending such a request is a "source node". The mechanism for handling the request at a node is the agent of the node. The target agent processes such requests using a finite number of resources, which are occupied while processing a request and released when processing the request is completed. If there is no resource available at the target agent, the request is "retried" by the source agent in response to a message sent indicating the need to retry the access request later. The request may also be retried if there is a conflicting request for the same memory address being processed at the target agent.

For those cache coherency protocols that allow retries of requests, it is possible that a request from one source agent encounters either a conflict or an unavailability of appropriate resources every time it is retried to the target. The result is that the request from that source agent is never serviced by the target agent. This failure to service a request is referred to as "starvation", and may result in a livelock in the system. In a livelock situation, some agents are either unable to complete their transactions or keep repeating the same operation without making progress. In the interest of system performance, it is critical to have a fair servicing mechanism that ensures forward progress in processing requests from multiple agents.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

In accordance with some embodiments, in system interface protocols that rely on retry for resource management and/or conflict resolution, a fair and/or scalable solution is provided. On example would be a cache coherence protocol in a shared memory multiprocessor system. In an embodiment, busy retries may be eliminated. Moreover, some embodiments may provide for strong fairness among competing requests.

In one embodiment, negatively-acknowledged (nack'ed) requests from a home agent may be tracked using distributed linked-lists, which may in turn serve the requests in a fair order as described in more detail below. For example, each request in the lists will eventually be invited to the home when it may be processed by the home agent. In an embodiment, the requesting agent may wait for an invitation from the home agent for any nack'ed request to resend the request; hence, there are no busy retries from requesting agents. Moreover, the requests for the same memory address may be invited in the same order as they had arrived at the home, e.g., providing fair service (e.g., in order) to the competing requesters. Accordingly, in some embodiments, a set of linked lists are applied to each resource at the home agent, e.g., to allow reservation of a special resource to control the fairness.

Figure 1:
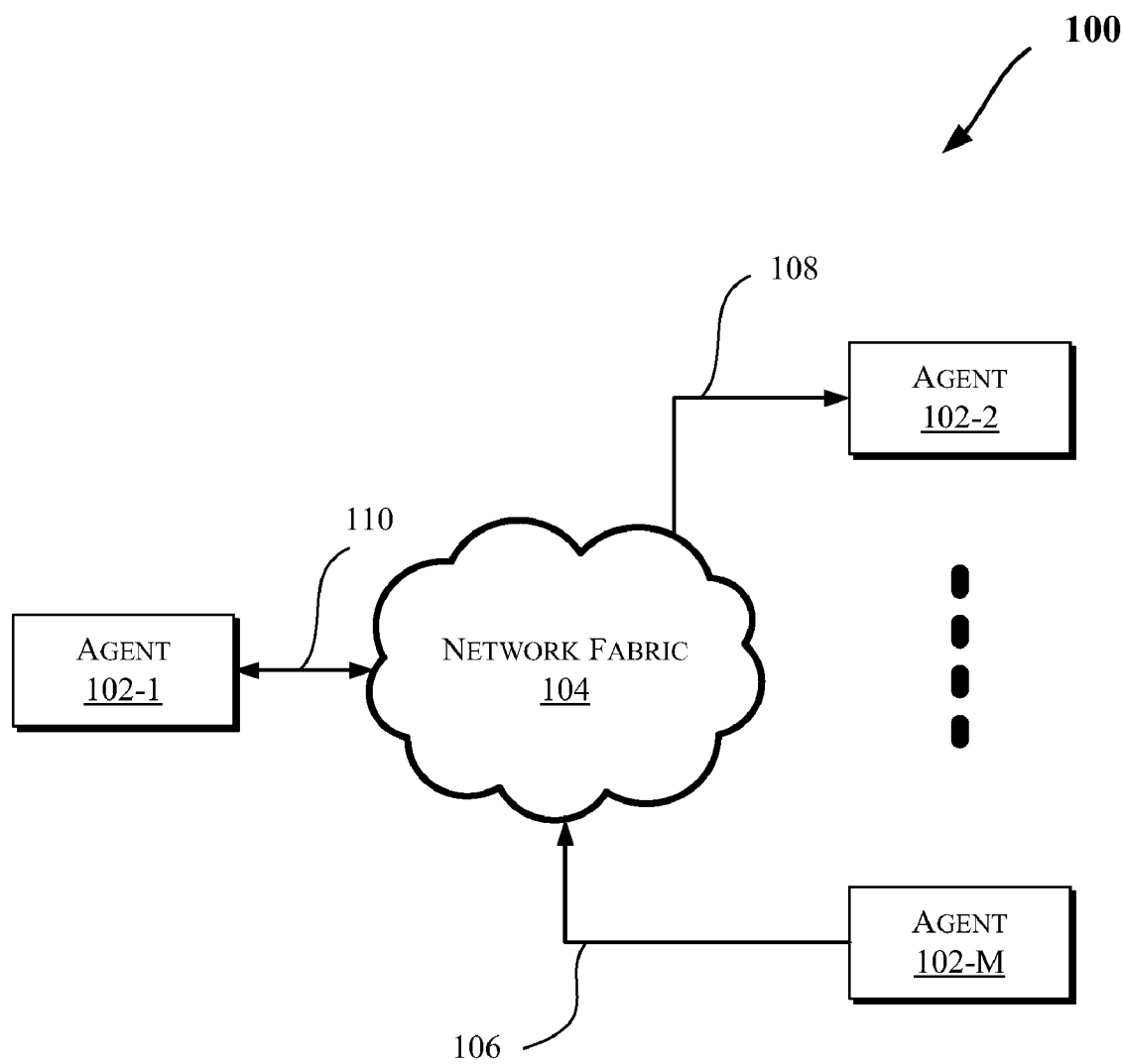
FIGS. 1, 3-4, and 7 illustrate block diagrams of embodiments of computing systems, which may be utilized to implement various embodiments discussed herein.

Various computing systems may be used to implements embodiments, discussed herein, such as the systems discussed with reference to FIGS. 1, 3-4, and 7. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIG. 3-4 or 7.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least of the agents 102 may be a home agent and one or more of the agents 102 may be requesting agents as will be further discussed with reference to FIG. 2. For example, in an embodiment, one or more of the agents 102 may maintain entries in a storage device (e.g., implemented as a table, queue, buffer, linked list, etc.) to track information about requests.

Figure 2:
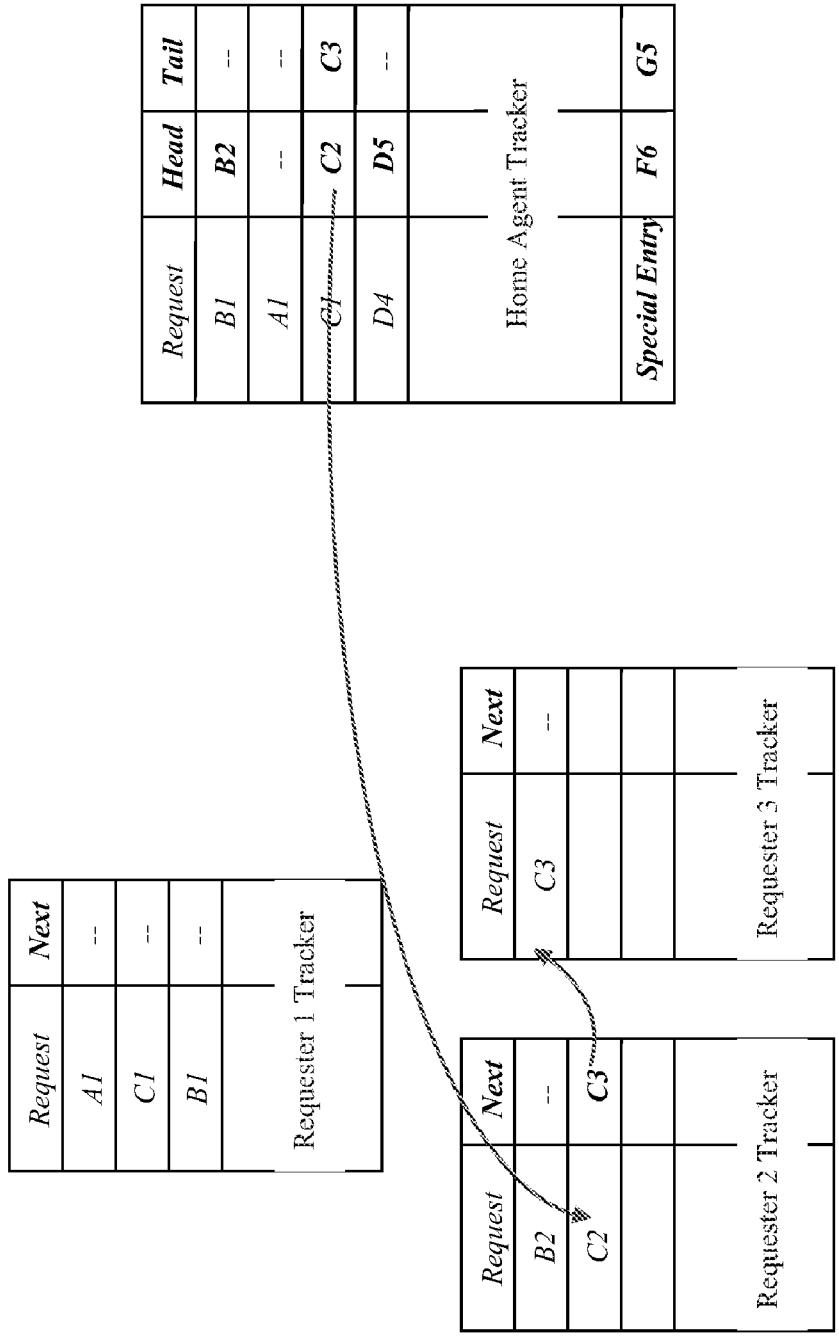
FIG. 2 data structure information retained in requester tracker (source) and home agent (target), accordingly to some embodiments.

More particularly, FIG. 2 illustrates data structure information retained in requester tracker (source) and home agent (target), accordingly to some embodiments. The request naming utilized in FIG. 2 is such that the first character indicates the address and the second character indicates the requester; for example, B2 corresponds to a request from Requester 2 to address B.

In one embodiment, each processing entry in the home agent maintains an associated linked list of nack'ed requests. One entry is reserved as special in order to track requests arrived when all other regular entries are occupied. However, more than one entry may be reserved as special in some embodiments. If a request is nack'ed due to a conflicting request being processed for a same address, the nack'ed request is appended to the list associated with the same processing entry. If a request is nack'ed because there is no processing entry available, the request is appended to the list associated to the special entry.

In some embodiments, to maintain distributed linked lists of nack'ed requests, each processing entry in the home agent (target) maintains two pointers, Head and Tail in FIG. 2, to record head and tail requests tracked by the associated linked list. The requesting agents (source) also maintains a pointer in each request entry, Next in FIG. 2, to point to a next request in the distributed linked list.

Figure 3:
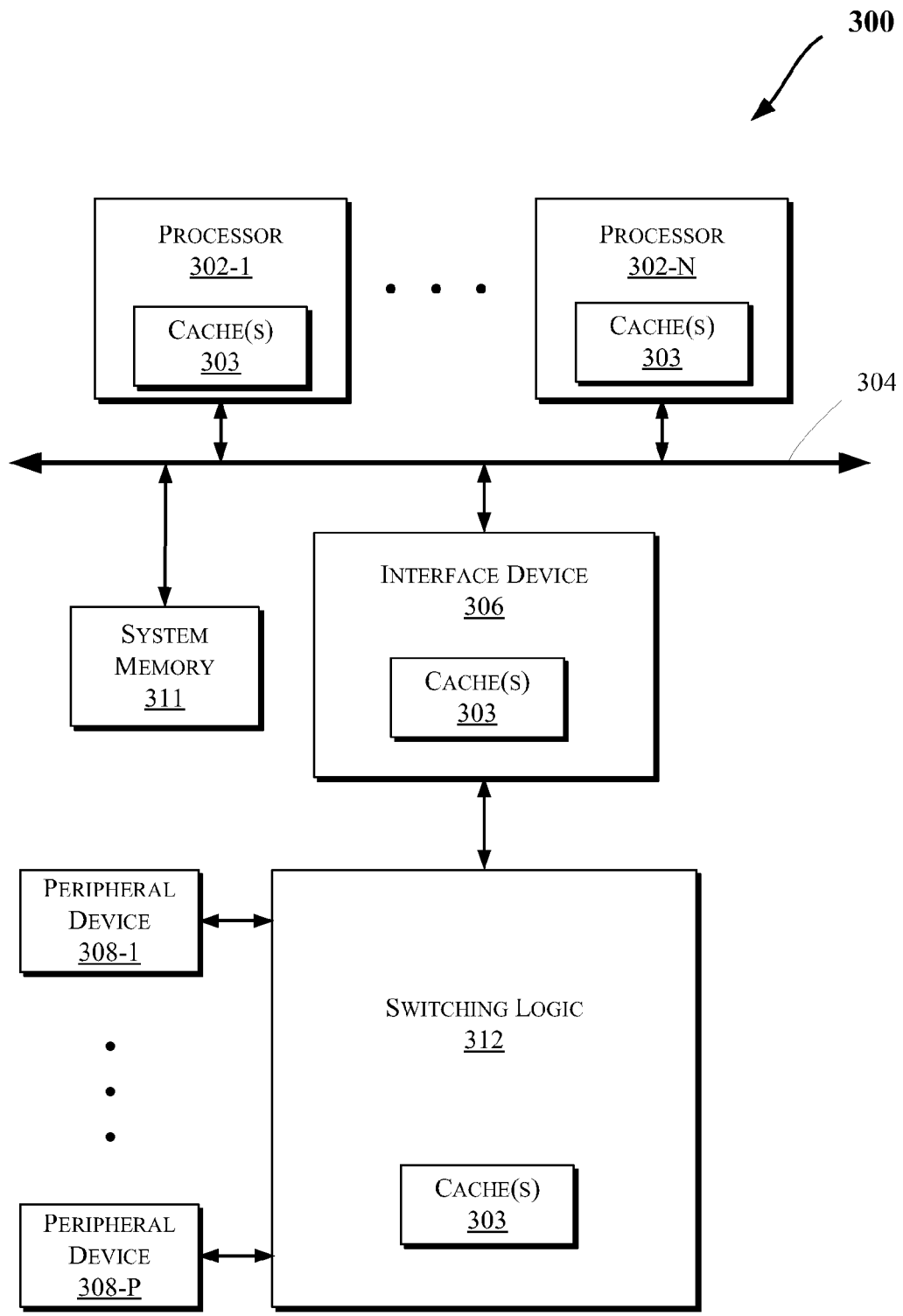

Various types of computing systems may be used to implement the embodiments discussed herein (such as those discussed with reference to FIGS. 1-2). For example, FIG. 3 illustrates a block diagram of portions of a computing system 300, according to an embodiment. In one embodiment, various components of the system 300 may be implemented by one of the agents 102-1 and/or 102-M discussed with reference to FIG. 1. Further details regarding some of the operation of the computing system 300 will be discussed herein with reference to FIGS. 5-6.

The system 300 may include one or more processors 302-1 through 302-N (collectively referred to herein as "processors 302" or more generally "processor 302"). Each of the processors 302-1 through 302-N may include various components, such as private or shared cache(s) 303, execution unit(s), one or more cores, etc. Moreover, the processors 302 may communicate through a bus 304 with other components such as an interface device 306. In an embodiment, the interface device 306 may be a chipset or a memory controller hub (MCH). Moreover, as will be further discussed with reference to FIG. 7, the processors 302 may communicate via a point-to-point (PtP) connection with other components. Additionally, the interface device 306 may communicate with one or more peripheral devices 308-1 through 308-P (collectively referred to herein as "peripheral devices 308" or more generally "device 308"). The devices 308 may be a peripheral device that communicates in accordance with the PCIe specification in an embodiment.

As shown in FIG. 3, a switching logic 312 may be coupled between a variety of agents (e.g., peripheral devices 308 and the interface device 306). The switching logic 312 may include a storage unit such as a cache that is maintained coherent (e.g., such as discussed with reference to FIGS. 2, 5, and/or 6) with the cache(s) 303, or caches present elsewhere in system 300 such as in one or more of the devices 308, interface device 306, switching logic 312, etc. Furthermore, cache(s) discussed herein (such as cache 303) may be shared or private. Also, such cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the computing systems discussed herein.

Figure 4:
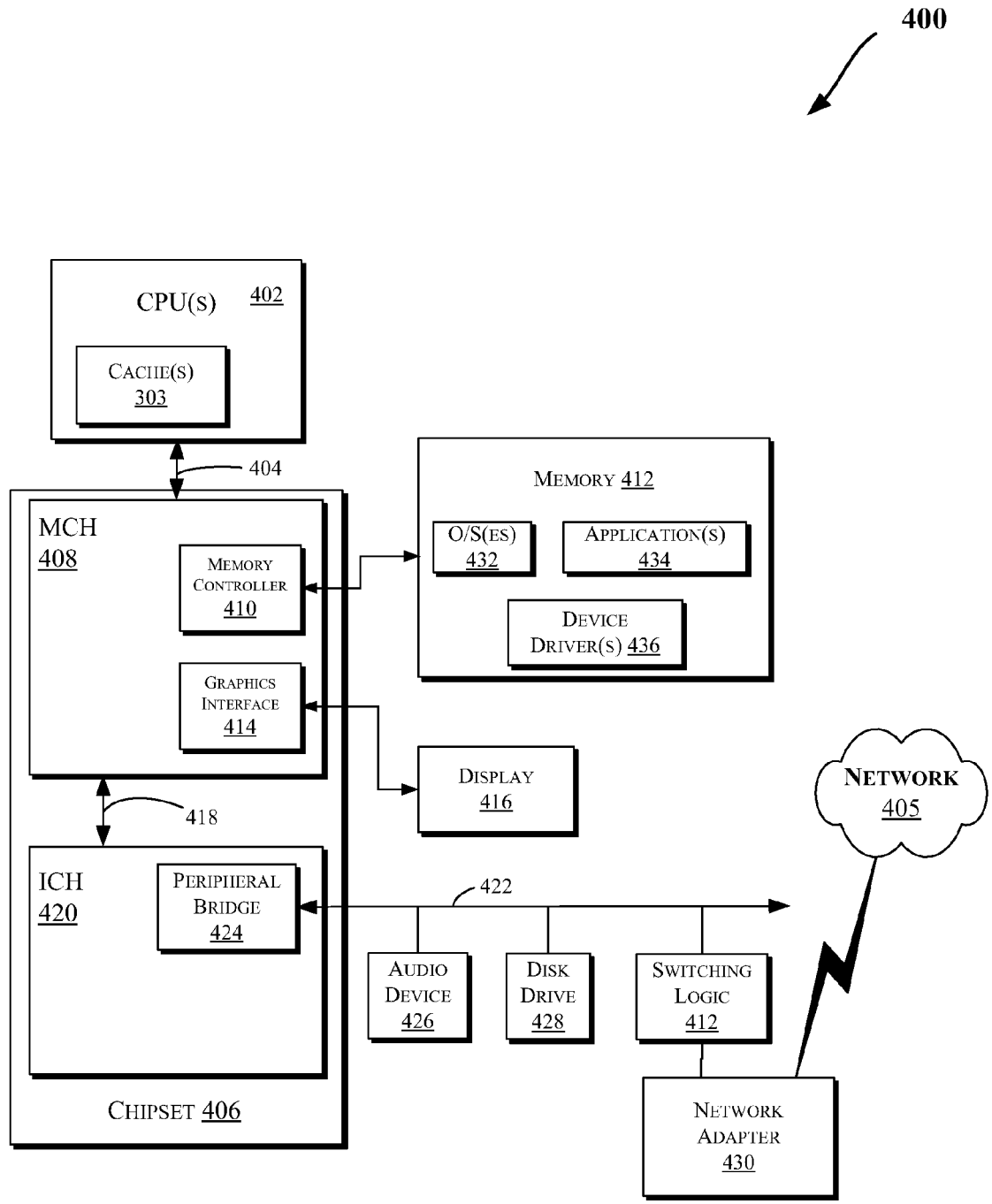

FIG. 4 illustrates a block diagram of an embodiment of a computing system 400. One or more of the agents 102 of FIG. 1 and/or the system 300 of FIG. 3 may comprise one or more components of the computing system 400. The computing system 400 may include one or more central processing unit(s) (CPUs) 402 (which may be collectively referred to herein as "processors 402" or more generically "processor 402") coupled to an interconnection network (or bus) 404. The processors 402 may be any type of processor such as a general purpose processor, a network processor (which may process data communicated over a computer network 405), etc. (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

The processor 402 may include one or more caches 303, which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 400. Also, as discussed herein, cache(s) 303 may be maintained such as discussed with reference to FIGS. 2, 5, and/or 6. Additionally, such cache(s) may be located in various locations (e.g., inside other components to the computing systems discussed herein, including systems of FIGS. 1, 3-4, and 7).

A chipset 406 may additionally be coupled to the interconnection network 404. In an embodiment, the chipset 406 may be the same as or similar to the interface device 306 of FIG. 3. Further, the chipset 406 may include a memory control hub (MCH) 408. The MCH 408 may include a memory controller 410 that is coupled to a memory 413. The memory 413 may store data, e.g., including sequences of instructions that are executed by the processor 402, or any other device in communication with components of the computing system 400. In an embodiment, the memory 413 may be the same or similar to the memory 311 of FIG. 3. Also, in one embodiment of the invention, the memory 413 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 404, such as multiple processors and/or multiple system memories.

The MCH 408 may further include a graphics interface 414 coupled to a display device 416 (e.g., via a graphics accelerator in an embodiment). In one embodiment, the graphics interface 414 may be coupled to the display device 416 via an accelerated graphics port (AGP). In an embodiment of the invention, the display device 416 (such as a flat panel display) may be coupled to the graphics interface 414 through, for example, a signal converter that translates a digital representation of an image stored in a storage device such as video memory or system memory (e.g., memory 413) into display signals that are interpreted and displayed by the display 416.

As shown in FIG. 4, a hub interface 418 may couple the MCH 408 to an input/output control hub (ICH) 420. The ICH 420 may provide an interface to input/output (I/O) devices coupled to the computing system 400. The ICH 420 may be coupled to a bus 422 through a peripheral bridge (or controller) 424, such as a peripheral component interconnect (PCI) bridge that may be compliant with the PCIe specification, a universal serial bus (USB) controller, etc. The bridge 424 may provide a data path between the processor 402 and peripheral devices. Other types of topologies may be utilized. Also, multiple buses may be coupled to the ICH 420, e.g., through multiple bridges or controllers. Further, the bus 422 may comprise other types and configurations of bus systems. Moreover, other peripherals coupled to the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 422 may be coupled to an audio device 426, one or more disk drive(s) 428, and a network adapter 430 (which may be a NIC in an embodiment). In one embodiment, the network adapter 430 or other devices coupled to the bus 422 may communicate with the chipset 406 via the switching logic 412 (which may be the same or similar to the logic 312 of FIG. 3 in some embodiments). Other devices may be coupled to the bus 422. Also, various components (such as the network adapter 430) may be coupled to the MCH 408 in some embodiments of the invention. In addition, the processor 402 and the MCH 408 may be combined to form a single chip. In an embodiment, the memory controller 410 may be provided in one or more of the CPUs 402. Further, in an embodiment, MCH 408 and ICH 420 may be combined into a Peripheral Control Hub (PCH).

Additionally, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 413 may include one or more of the following in an embodiment: an operating system (O/S) 432, application 434, and/or device driver 436. The memory 413 may also include regions dedicated to Memory Mapped I/O (MMIO) operations. Programs and/or data stored in the memory 413 may be swapped into the disk drive 428 as part of memory management operations. The application(s) 434 may execute (e.g., on the processor(s) 402) to communicate one or more packets with one or more computing devices coupled to the network 405. In an embodiment, a packet may be a sequence of one or more symbols and/or values that may be encoded by one or more electrical signals transmitted from at least one sender to at least on receiver (e.g., over a network such as the network 405). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 405).

In an embodiment, the application 434 may utilize the O/S 432 to communicate with various components of the system 400, e.g., through the device driver 436. Hence, the device driver 436 may include network adapter 430 specific commands to provide a communication interface between the O/S 432 and the network adapter 430, or other I/O devices coupled to the system 400, e.g., via the chipset 406.

In an embodiment, the O/S 432 may include a network protocol stack. A protocol stack generally refers to a set of procedures or programs that may be executed to process packets sent over a network 405, where the packets may conform to a specified protocol. For example, TCP/IP (Transport Control Protocol/Internet Protocol) packets may be processed using a TCP/IP stack. The device driver 436 may indicate the buffers in the memory 413 that are to be processed, e.g., via the protocol stack.

The network 405 may include any type of computer network. The network adapter 430 may further include a direct memory access (DMA) engine, which writes packets to buffers (e.g., stored in the memory 413) assigned to available descriptors (e.g., stored in the memory 413) to transmit and/or receive data over the network 405. Additionally, the network adapter 430 may include a network adapter controller, which may include logic (such as one or more programmable processors) to perform adapter related operations. In an embodiment, the adapter controller may be a MAC (media access control) component. The network adapter 430 may further include a memory, such as any type of volatile/nonvolatile memory (e.g., including one or more cache(s) and/or other memory types discussed with reference to memory 413).

Figure 5:
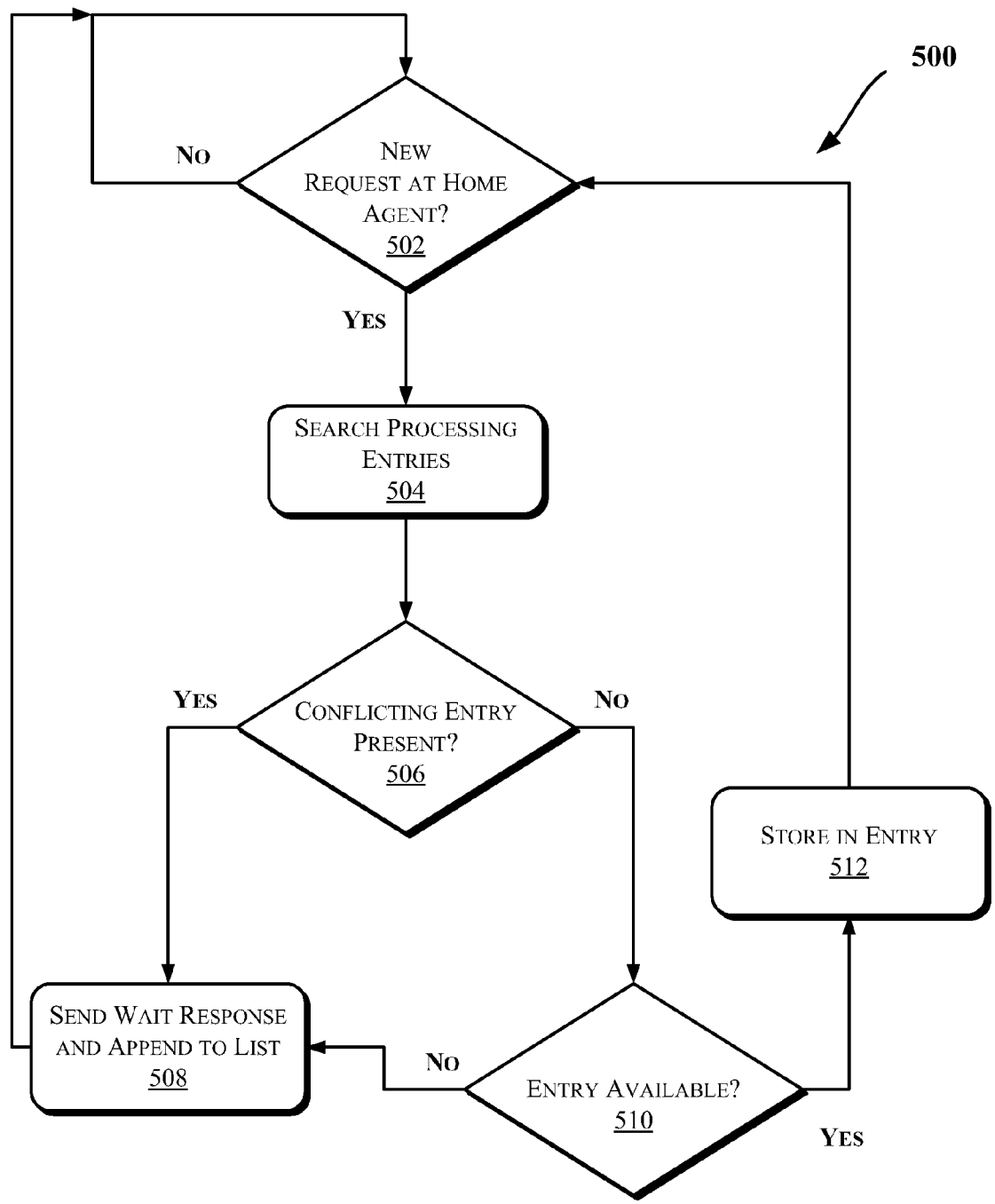
FIGS. 5-6 illustrate flow diagrams according to some embodiments.

FIG. 5 illustrates a flow diagram of a method 500 to be performed at a home agent (target), according to an embodiment. In one embodiment, various components discussed with reference to FIGS. 1-4 and 7 may be utilized to perform one or more of the operations discussed with reference to FIG. 5.

Referring to FIGS. 1-5, at an operation 502, when a new request arrives at the home agent, processing entries in the home are searched 504 to find a conflicting request to the same address 506 being processed based on the received request of operation 502. If a conflicting entry for the same address is found, a wait response is sent 508 to the requester and the request is appended to the list associated with the processing entry. In an embodiment, if head pointer is empty, then the request is recorded as head pointer. Otherwise, if tail pointer is empty, then the request is recorded as tail pointer and a next message to the requester is sent in the head pointer (so that the old request occupying head pointer can record its next pointer to the new request). Otherwise, the tail pointer is replaced with the new request and a next message to the requester is sent in the old tail pointer (so that the old request occupying tail pointer can record its next pointer to the new request).

If a conflicting entry is not found at operation 506 and if a regular entry is available at operation 510, the request of operation 502 is accepted into a regular entry 512. In an embodiment, if a regular entry is unavailable 510, then a special entry is used if available at operation 512. If no regular or special entries are available 510, a wait response is sent to the requester and the request is appended to the list associated with the special entry following the process discussed with reference to operation 508.

In an embodiment, once a processing entry completes a request and becomes available, the home agent sends a resend invitation to the request in the head pointer if any, with an indication of existence of a next request (e.g., false if its Tail pointer is empty; true otherwise). The indication allows the requester to wait for a possible next message in transit before resending its nack'ed request. Further, in one embodiment, when a resent request invited to a regular entry arrives, the request may be accepted and the Head pointer may be replaced with the next pointer in the resent message if any. If there is no next pointer, then the head pointer may be cleared. If the next pointer matches to the Tail pointer, then the tail pointer may be cleared.

In one embodiment, when a resent request invited to a special entry arrives, the same operations as for a new request discussed above may be followed. In this case, however, the situation in operation 508 may not occur again because a special entry has been reserved for this request. The request should be accepted into one of the processing entries, or appended to a list associated with a regular entry, which will be guaranteed to be accepted next time.

Figure 6:
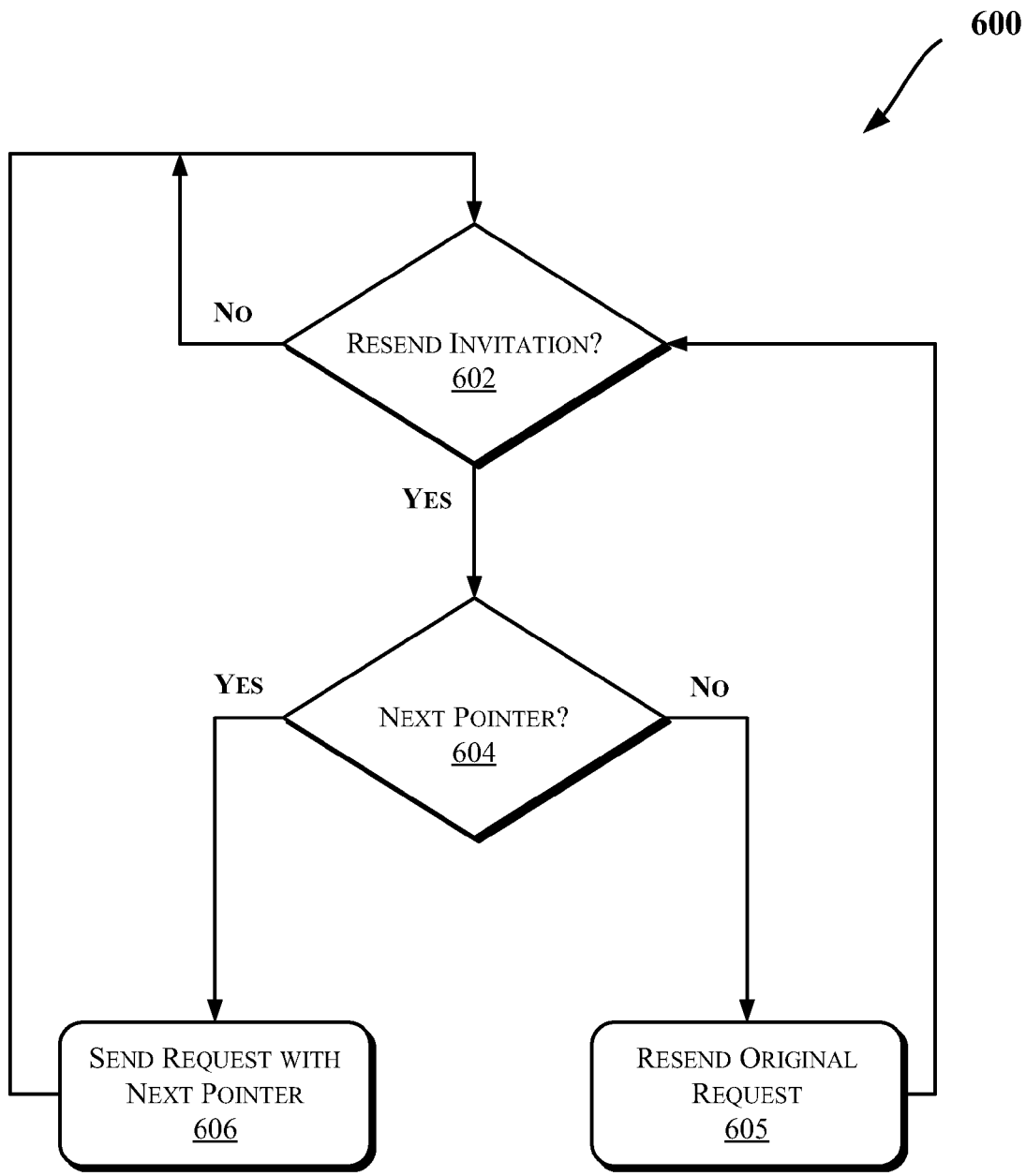

FIG. 6 illustrates a flow diagram of a method 600 to be performed at a requesting agent (source), according to an embodiment. In one embodiment, various components discussed with reference to FIGS. 1-4 and 7 may be utilized to perform one or more of the operations discussed with reference to FIG. 6.

Referring to FIGS. 1-6, at an operation 602, when a nack'ed request receives a resend invitation, if the resend message is without a next pointer 604, the original request is resent at operation 605; otherwise, if the resend message indicates existence of a next pointer 604, the requester resends 606 the request to the home with its next pointer. In an embodiment, the requester may wait for a next message before resending the request at operation 606. As shown in FIG. 6, after operations 605 and 606, the method 600 resumes at operation 602.

In some embodiments, if the cache coherence protocol allows some requests to be cancelled while waiting for a resend invitation, e.g., a write-back request voided after an implicit write-back response provided, the requester may still follow the same operations by resending a void request with the next pointer if any.

Figure 7:
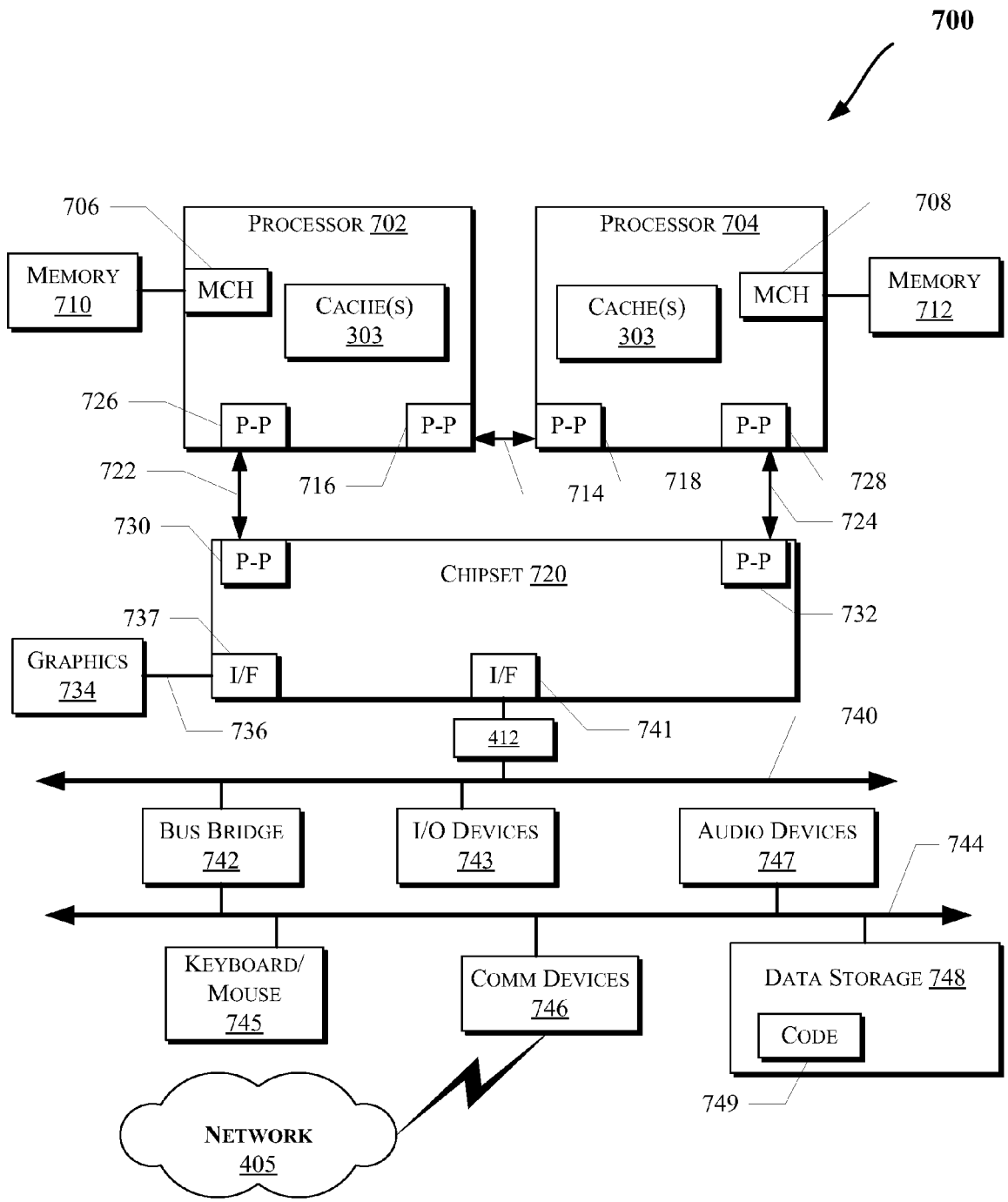

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 413 of FIG. 4. As shown in FIG. 7, the processors 702 and 704 (or other components of system 700 such as chipset 720, I/O devices 743, etc.) may also include one or more cache(s) such as those discussed with reference to FIGS. 1-6.

In an embodiment, the processors 702 and 704 may be one of the processors 402 discussed with reference to FIG. 4. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

In at least one embodiment, the switching logic 412 may be coupled between the chipset 720 and other components of the system 700 such as those communicating via a bus 740. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may communicate with the bus 740 using a PtP interface circuit 741. The bus 740 may have one or more devices that communicate with it, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 405), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
   a first processor core comprising a first cache, the first cache to store a first table, wherein at least one entry of the first table is to correspond to a first request to be negatively-acknowledged by the first processor core; and
   a second processor core comprising a second cache, the second cache to store a second table, wherein at least one entry of the second table is to correspond to the first request to be negatively-acknowledged by the first processor core, the at least one entry of the second table to comprise a next pointer, corresponding to a second request that is to be processed.

2. The processor of claim 1, wherein the at least one entry of the first table is to comprise a head pointer, corresponding to a head request tracked by the first table, and a tail pointer, corresponding to a tail request tracked by the first table.

3. The processor of claim 2, wherein the head pointer, the tail pointer, and the next pointer are to form a linked list corresponding to negatively-acknowledged requests to be processed by the processor.

4. The processor of claim 1, wherein the first processor core is to invite the second processor core to resend the first request in response to availability of a processing entry at the first processor core.

5. The processor of claim 1, wherein the first request comprises information corresponding to a target address and a requester processor core.

6. The processor of claim 1, wherein the first table is to comprise a special entry to store information corresponding to a request that is to be negatively acknowledged in response to unavailability of a regular entry in the first table.

7. The processor of claim 5, wherein, the first processor core is to send a wait response to the second processor core in response to unavailability of both the regular entry and the special entry in the first table.

8. The processor of claim 1, wherein the first processor core is to process the second request after the first request.

9. The processor of claim 1, wherein the first and second caches are to be kept coherent.

10. The processor of claim 1, wherein one or more of the first processor core and the second processor core are on a same integrated circuit die.

11. A method comprising:
   storing a first table in a home agent, wherein at least one entry of the first table is to correspond to a first request to be negatively-acknowledged by the home agent; and
   storing a second table in a requesting agent, wherein at least one entry of the second table is to correspond to the first request to be negatively-acknowledged by the home agent, the at least one entry of the second table to comprise a next pointer, corresponding to a second request that is to be processed by the home agent.

12. The method of claim 11, further comprising storing a head pointer in the at least one entry of the first table, corresponding to a head request tracked by the first table, and a tail pointer in the at least one entry of the first table, corresponding to a tail request tracked by the first table.

13. The method of claim 12, further comprising recording the first request as the head pointer in response to a determination that the head pointer is empty.

14. The method of claim 12, further comprising recording the first request as the tail pointer in response to a determination that the head pointer is filled and the tail pointer is empty.

15. The method of claim 12, further comprising:
   recording the first request as the tail pointer in response to a determination that both the head pointer and the pointer are filled; and
   sending a message to the requesting agent corresponding to a previous tail pointer.

16. The method of claim 11, further comprising the home agent inviting the requesting agent to resend the first request in response to availability of a processing entry at the home agent.

17. The method of claim 11, further comprising storing information in a special entry of the first table, corresponding to a request that is to be negatively acknowledged by the home agent, in response to unavailability of a regular entry in the first table.

18. The method of claim 17, further comprising the home agent sending a wait response to the requesting agent in response to unavailability of both the regular entry and the special entry in the first table.

19. The method of claim 11, further comprising processing the second request after the first request.

20. The method of claim 11, further comprising canceling at least one request, which is negatively acknowledged by the home agent, while waiting for a resend invitation.

21. A computing system comprising:
   a first processor coupled to a second processor;
   the first processor comprising a first memory, the first memory to store a first table, wherein a first entry of the first table is to correspond to a first request, from the second processor, to be negatively-acknowledged by the first processor; and
   the second processor comprising a second memory, the second memory to store a second table, wherein at least one entry of the second table is to correspond to the first request to be negatively-acknowledged by the first processor, the at least one entry of the second table to comprise a next pointer, corresponding to a second request that is to be processed by the first processor after the first request.

22. The system of claim 21, wherein the at least one entry of the first table is to comprise a head pointer, corresponding to a head request tracked by the first table, and a tail pointer, corresponding to a tail request tracked by the first table.

23. The system of claim 22, wherein the head pointer, the tail pointer, and the next pointer are to form a linked list corresponding to negatively-acknowledged requests to be processed by the processor.

24. The system of claim 22, wherein the head pointer, the tail pointer, and the next pointer are to form a linked list corresponding to negatively-acknowledged requests to be processed by the processor.

25. The system of claim 21, wherein the first processor is to invite the second processor to resend the first request in response to availability of a processing entry at the first processor.

26. The system of claim 21, wherein the first request comprises information corresponding to a target address and a requester processor.

27. The system of claim 21, wherein the first table is to comprise a special entry to store information corresponding to a request that is to be negatively acknowledged in response to unavailability of a regular entry in the first table.

28. The system of claim 21, wherein the first and second memories respectively comprise a first cache and a second cache, wherein the first and second caches are to be kept coherent.

29. The system of claim 21, further comprising an audio device couple to at least one of the first or second processors.

30. The system of claim 21, wherein one or more of the first processor and the second processor are on a same integrated circuit die.

* * * * *